United States Patent
Vugts et al.

(10) Patent No.: US 11,732,883 B2
(45) Date of Patent: Aug. 22, 2023

(54) HAND HELD PERSONAL CARE DEVICE WITH A LIGHT SYSTEM

(71) Applicant: KONINKLIJKE PHILIPS N.V., Eindhoven (NL)

(72) Inventors: Marinus Arnoldus Martinus Vugts, Beetsterzwaag (NL); Kam Hing Yau, Groningen (NL); Pascal Jean Henri Bloemen, Eindhoven (NL); Marc Alexander Pastoors, Gieten (NL); Daniele Solerio, Groningen (NL); Marcus Franciscus Eijkelkamp, Peize (NL); Sint Baron, De Knipe (NL); Hendrik Klaas Paauw, Roden (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/633,225

(22) PCT Filed: Aug. 13, 2020

(86) PCT No.: PCT/EP2020/072708
§ 371 (c)(1),
(2) Date: Feb. 7, 2022

(87) PCT Pub. No.: WO2021/032578
PCT Pub. Date: Feb. 25, 2021

(65) Prior Publication Data
US 2022/0307681 A1    Sep. 29, 2022

(30) Foreign Application Priority Data

Aug. 20, 2019 (EP) .................................... 19192540

(51) Int. Cl.
*F21V 33/00* (2006.01)
*B26B 19/38* (2006.01)
(Continued)

(52) U.S. Cl.
CPC .......... *F21V 33/004* (2013.01); *B26B 19/388* (2013.01); *B26B 19/3853* (2013.01);
(Continued)

(58) Field of Classification Search
CPC ..... F21V 33/004; F21V 31/005; B62B 19/14; B62B 19/3853; B62B 19/388; G02B 19/14
See application file for complete search history.

(56) References Cited

U.S. PATENT DOCUMENTS

| 2013/0000059 A1 | 1/2013 | Jungnickel |
| 2019/0061183 A1 | 2/2019 | Neyer |

FOREIGN PATENT DOCUMENTS

| CN | 207852541 U | 9/2018 |
| EP | 3372357 A1 | 9/2018 |

(Continued)

OTHER PUBLICATIONS

International Search Report and Written Opinion dated Nov. 18, 2020 for International Application No. PCT/EP2020/72708 Filed Aug. 13, 2020.

*Primary Examiner* — Thomas M Sember (57) ABSTRACT

A hand held personal care device (1) with an operative unit (3) connected to a main housing (2), a light source (24), and an optically transparent light guide (23) having a light receiving surface (27), a light emitting surface (6) and a light guiding member (31) extending from the light receiving surface to the light emitting surface for guiding light from the light receiving surface to the light emitting surface. The light source is arranged in a watertight chamber (51) of the main housing. The main housing includes an optically transparent wall portion (52) arranged adjacent to the light source and bounding the watertight chamber. The light guide is arranged outside the watertight chamber and the light receiving surface is arranged adjacent to the optically trans- (Continued)

parent wall portion in a position for receiving light from the light source via the optically transparent wall portion.

15 Claims, 5 Drawing Sheets

(51) Int. Cl.
*F21V 31/00* (2006.01)
*F21V 8/00* (2006.01)
*B26B 19/14* (2006.01)

(52) U.S. Cl.
CPC .......... *F21V 31/005* (2013.01); *G02B 6/0068* (2013.01); *B26B 19/14* (2013.01)

(56) References Cited

FOREIGN PATENT DOCUMENTS

| | | |
|---|---|---|
| JP | 2001311633 A | 11/2001 |
| JP | 2013152125 A | 8/2013 |
| JP | 2016185214 A | 10/2016 |
| JP | 2018196484 A | 12/2018 |
| WO | 2014/191184 A1 | 12/2014 |
| WO | 2018/100155 A1 | 6/2018 |
| WO | 2018/198640 A1 | 11/2018 |

HAND HELD PERSONAL CARE DEVICE WITH A LIGHT SYSTEM

CROSS REFERENCE TO RELATED APPLICATIONS

This application is the U.S. National Phase application under 35 U.S.C. § 371 of International Application No. PCT/EP2020/072708 filed Aug. 13, 2020, which claims the benefit of European Patent Application Number 19192540.3 filed Aug. 20, 2019. These applications are hereby incorporated by reference herein.

FIELD AND BACKGROUND OF THE INVENTION

The present invention relates to a hand held personal care device with a light system.

JP2016-185214A discloses a shaving device having a light guide that forms sealed closures of window openings in a bottom plate of a recess in which external and internal cutter members are accommodated. Internally of the light guide, light sources are provided. In operation, light from the light sources passes through the light guide and is emitted through the openings in the plate located inwardly of the external and internal cutter members and shines against and past these cutter members. The lighting creates an illusion of atmosphere and activates a photo catalyst that causes organic substances to decompose to prevent odour emissions. The light leaking past the outer cutter member lights the skin and thereby facilitates shaving.

From JP2018-196484A, a shaving device is known wherein a light transmitting cover plate has light guides projecting through window openings in a plate at a bottom of a recess in which external and internal cutter members are accommodated. Internally of the light guides light sources are provided. In operation, light from the light sources passes through the openings in the plate via the light guides and is emitted inwardly of the external and internal cutter members and shines against and past these cutter members. The lighting facilitates shaving whiskers and excites bactericidal action of a photo catalyst. Furthermore, the light emission state of the light sources can indicate the charging state of the battery.

SUMMARY OF THE INVENTION

It is an object of the present invention to provide a hand held personal care device in which light of a light system provided in the device is more easily and more continuously visible during use, while a low cost yet reliable shielding of the light source of the light system against liquids and dust is achieved.

According to the present invention, this object is achieved by providing a hand held personal care device according to claim 1.

Because the main housing includes an optically transparent wall portion arranged adjacent to the light source and bounding the watertight chamber, and because the light guide is arranged outside the watertight chamber and the light receiving surface is arranged adjacent to the optically transparent wall portion in a position for receiving light from the light source via the optically transparent wall portion, the light source is very reliably shielded against liquids and dust. Because the light guide does not extend into the watertight chamber, no opening needs to be provided in the watertight chamber via which the light guide can extend into the watertight chamber and, consequently, no sealing member needs to be provided along the light guide at the position of such an opening for shielding the watertight chamber and the light source arranged therein. Moreover, because the light guide can guide light, generated by the light source and leaving the watertight chamber via the optically transparent wall portion, along a distance to a position where the light is to be emitted or to be made visible for the user, a high degree of freedom of design with regard to the location of the light source, the watertight chamber and the optically transparent wall portion is achieved, so that the light can be made more easily visible in any desired position in particular on the outer surface of the main housing. In particular, the location of the light source can be relatively far away from the location where the light is to be emitted or to be made visible, and the emitted light may be visible from directions different from the direction in which the light source emits the light or the direction in which an outside surface of the optically transparent wall portion is facing.

Particular embodiments, features of the invention and effects thereof are set forth in the dependent claims and the description and appear from the drawings.

DETAILED DESCRIPTION OF THE EMBODIMENTS

In the drawings, an example of a hand held personal care device 1 according to the invention is shown having a main housing 2 arranged to be held by hand and an operative unit 3 for carrying out a personal care operation to a body part of the user. In this example, the personal care device is an electric shaving device of which the operative unit is a shaving unit 3. However, the personal care device may also be a device with an operative unit for use in other personal care operations, such as an epilating head, a hot air outflow opening (e.g. for hair-drying), a heated hair clamp (e.g. for hair-curling or hair-straightening) or a temperature sensor (for measuring body temperature). The operative unit may be arranged mainly outside the main housing, as for instance in the present example, or be arranged partially, mainly or completely inside the main housing, for instance with an operative head, surface or opening flush with adjacent portions of the main housing.

Figure 1:
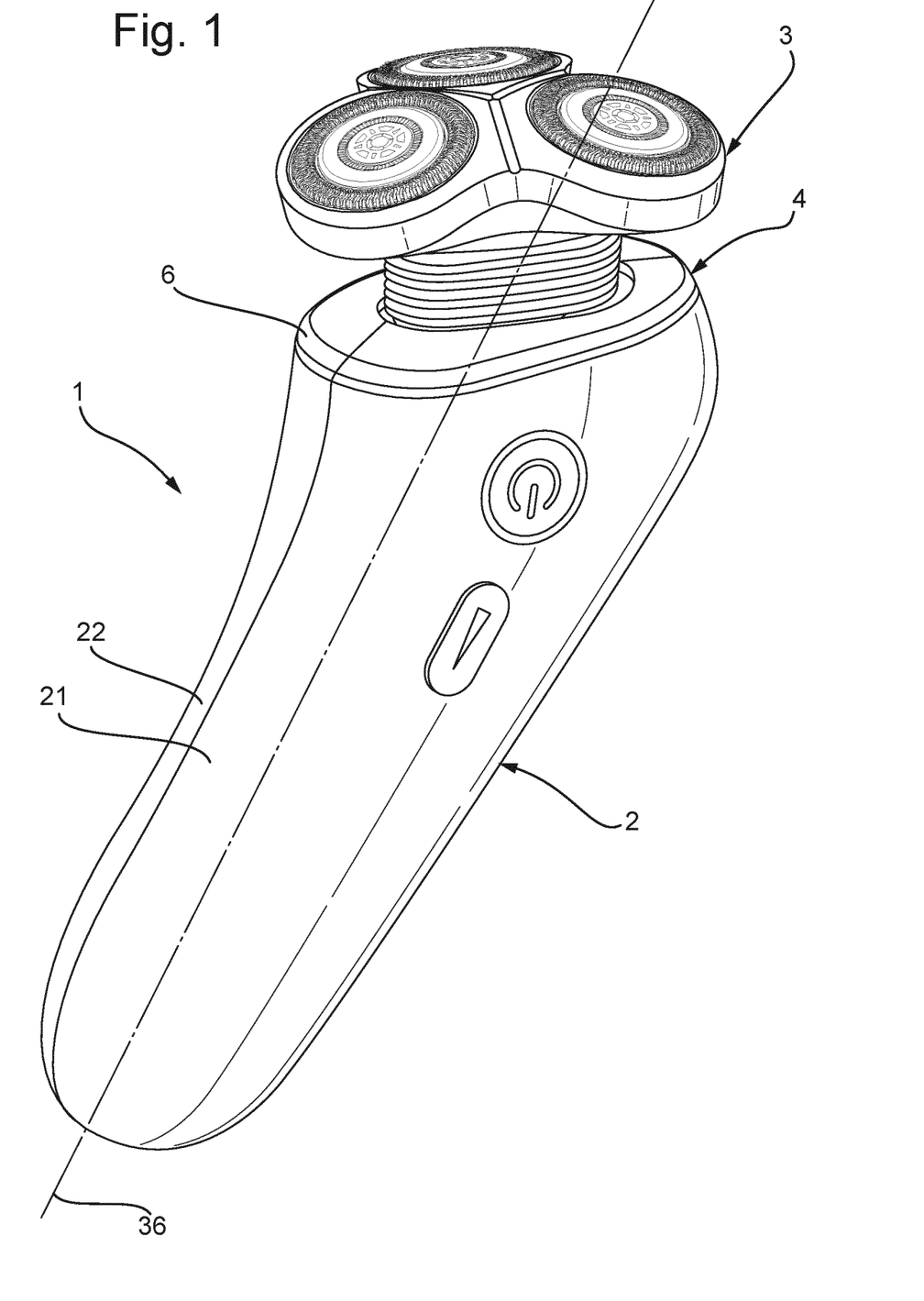
FIG. 1 is a perspective view of an example of a device according to the invention.
Figure 2:
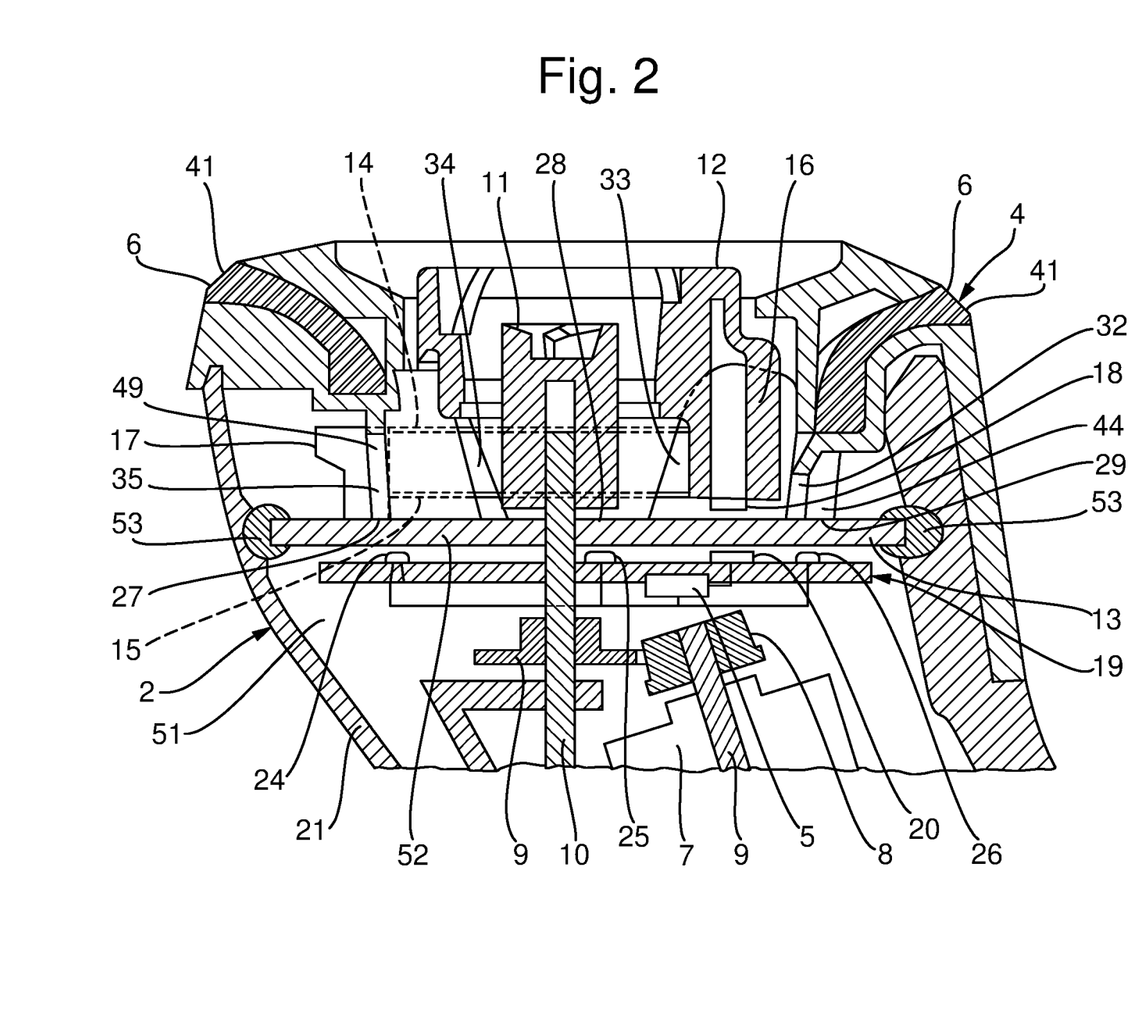
FIG. 2 is a cross-sectional view of a top portion of a main housing of the device according to FIG. 1.
Figure 3:
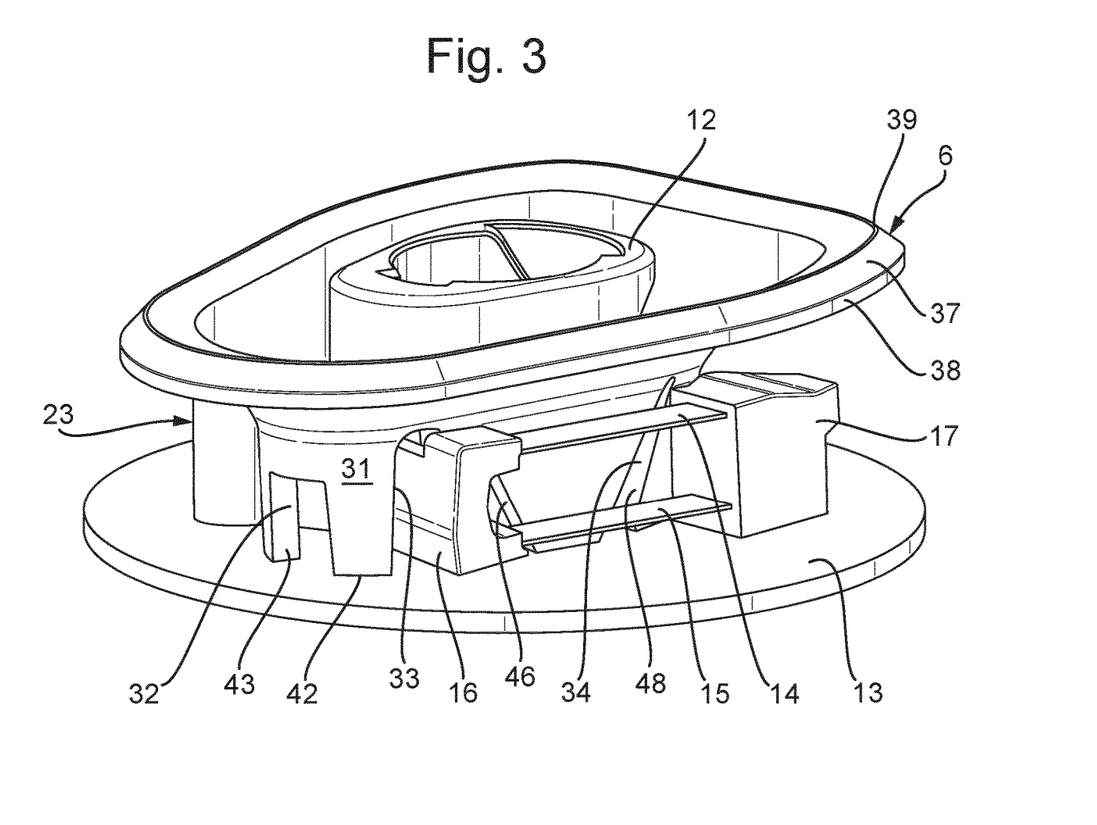
FIG. 3 is a perspective view of a light guide and a shaving unit carrier and a housing shield of the device according to FIGS. 1 and 2.
Figure 4:
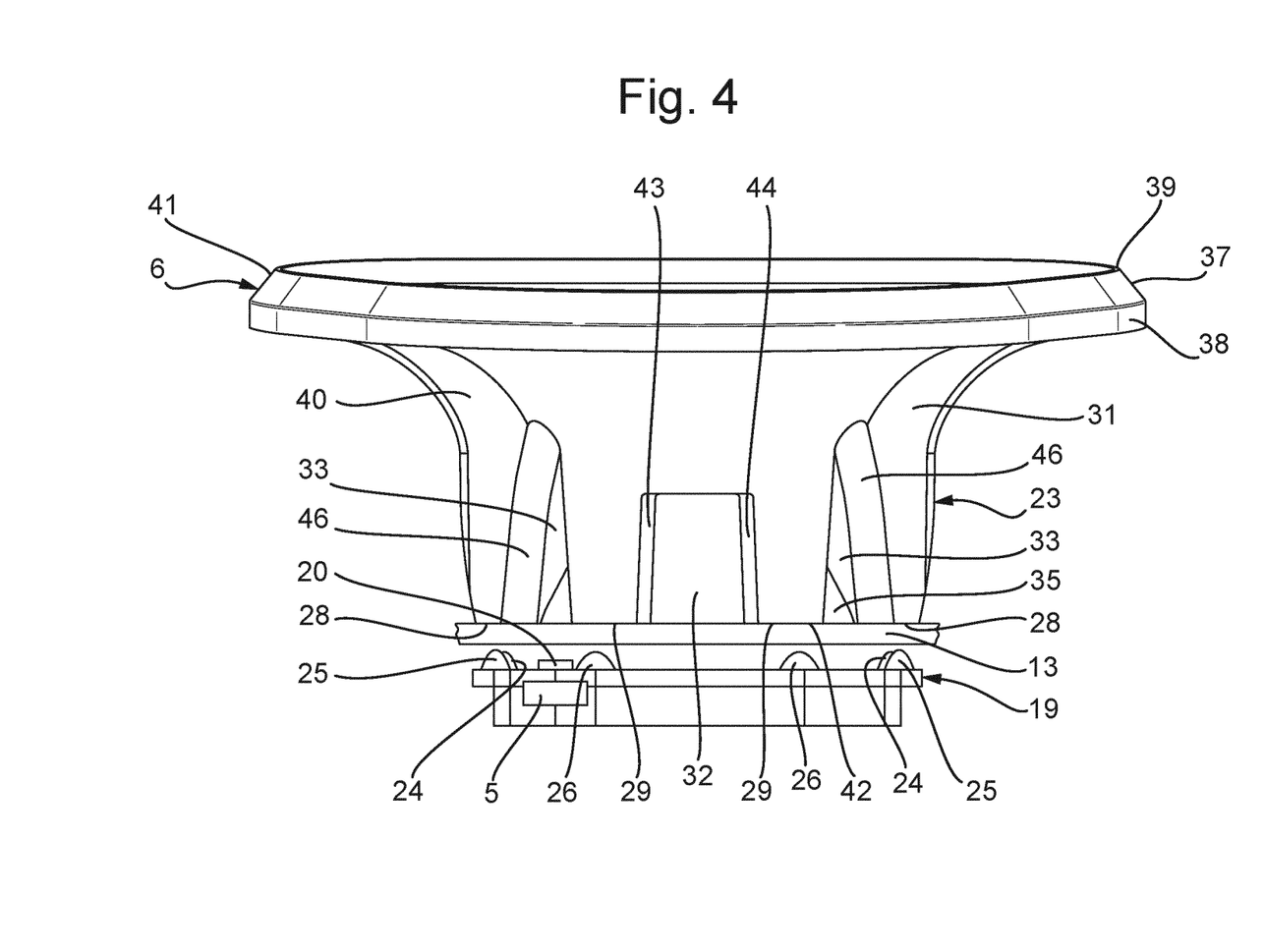
FIG. 4 is a frontal view of the light guide, a housing shield and a printed circuit board of the device according to FIGS. 1-3.
Figure 5:
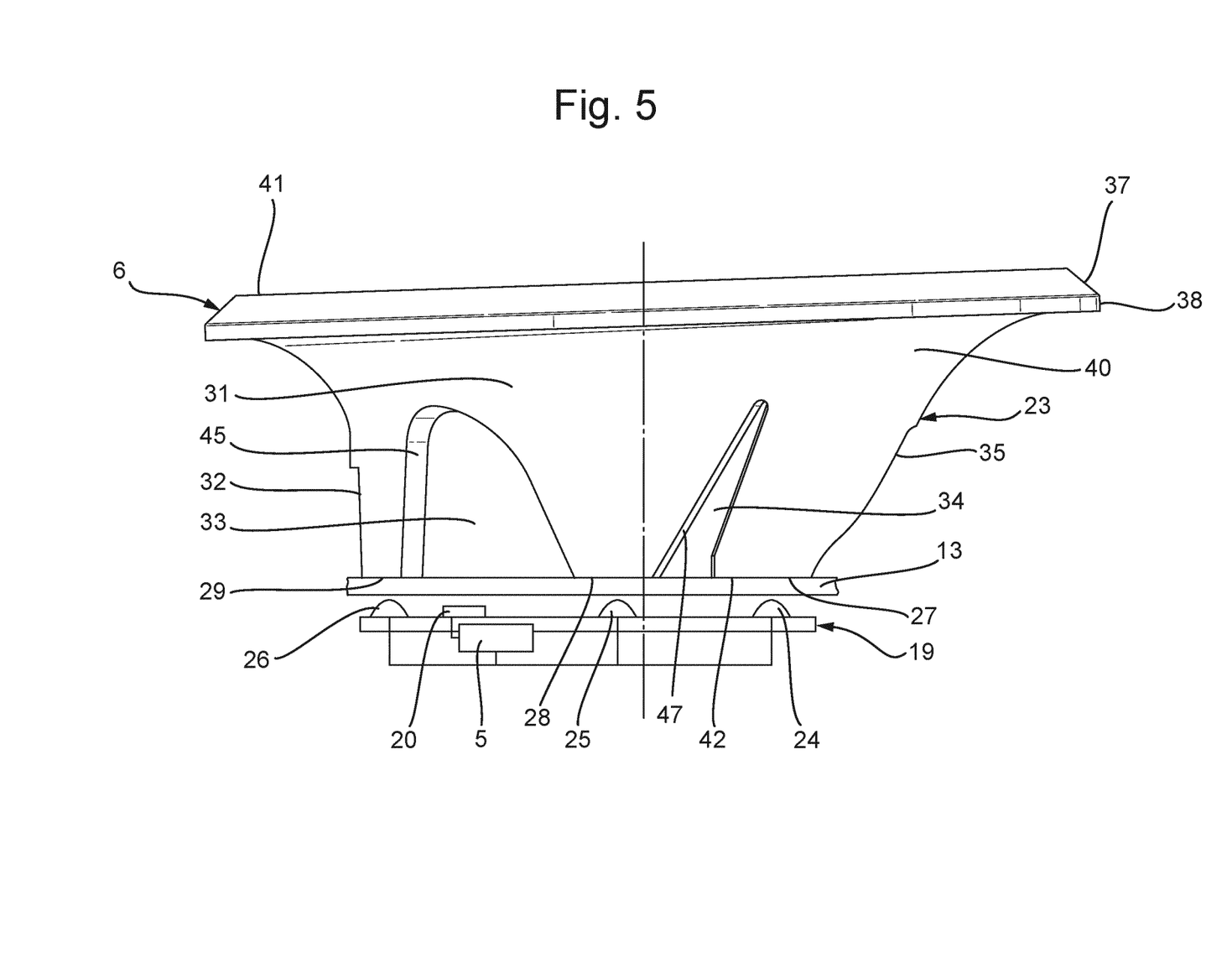
FIG. 5 is a side view of the light guide, the housing shield and the printed circuit board of the device according to FIGS. 1-4.

In this example, as is shown in FIGS. 2 and 3, a motor 7 is arranged in the main housing 2 and a driving gear wheel 8 is mounted to a motor output drive shaft 9 projecting from the motor 7. The driving gear wheel 8 engages a driven gear wheel 9 fixed to a central drive shaft 10. The central drive shaft 10 is rotatably suspended in the main housing 2. A driving coupling 11 is coupled to a free end of the central drive shaft 10 and arranged for driving engagement with a driven coupling (not shown) of the shaving unit 3. The shaving unit 3 is removably connectable to a shaving unit carrier 12. The shaving unit carrier 12 is suspended relative to a shield 13 via pairs of leaf springs 14, 15 on opposite sides of the shaving unit carrier 12 and connected to a carrier beam 16 of the shaving unit carrier 12. The shield 13 is fixed between shells 21, 22 of the main housing 2. Ends of the leaf springs 14, 15 opposite of the ends mounted to the carrier beam 16 are coupled to pedestals 17 on corresponding, mutually opposite sides of the shaving unit carrier 12. The pedestals 17 are fixed relative to the shield 13.

A magnet 18 is mounted to a bottom side of the shaving unit carrier 12. Closely below the shield 13, a printed circuit board (PCB) 19 carrying a Hall sensor 20 close to the magnet 18 and aligned with the magnet 18 is mounted in the main housing 2. The Hall sensor 20 is connected to a circuitry 5 which is also mounted to the PCB 19. Light sources 24, 25, 26 are also mounted to the PCB 19 and are also arranged in the main housing 2. The circuitry 5 is arranged for outputting a voltage for activating or deactivating the light sources 24-26 in response to a measured distance between the magnet 18 and the Hall sensor 20, which represents a shaving pressure exerted on the shaving unit 3. The light sources 24-26 are activated if a too high shaving pressure causes the shaving unit 3 to press the shaving unit carrier 12 further towards the shield 13 than if the shaving pressure would be within a preferred range or below a given threshold value. In response to such a too small measured distance between the magnet 18 and the Hall sensor 20, the circuitry could cause e.g. green light sources to be deactivated, and e.g. red light sources to be activated. An intermediate distance in which for instance orange or yellow light sources are activated and the other light sources are deactivated is also conceivable. It is also possible to use RGB LEDs so that the light sources can each be controlled to emit light of a particular colour, e.g. blue for a too low shaving pressure, green for a shaving pressure within an advisable range and red for a too high shaving pressure.

The indication of the exerted shaving pressure occurs by a light system 4 accommodated in the main housing 2 of the device 1, of which light system 4 the light sources 24-26 are parts. Thus, the light system 4 is connected to be activated in accordance with exerted shaving pressure and forms an indicator of exerted shaving pressure.

The light system 4 may alternatively or additionally be connected to circuitry for monitoring other operational conditions of the device, such as a sensing circuitry for indicating progress of a shaving operation, a circuitry for indicating battery charge status or a circuitry for indicating whether cleaning or replacement of (parts of) the shaving unit is advisable.

The light system 4 has a light emitting surface 6 near the shaving unit 3, which light emitting surface 6 extends circumferentially around the main housing 2 as a closed loop surface about a main axis of extension 36 of the main housing 2.

Because the light emitting surface 6 constitutes a closed loop surface extending circumferentially around the main housing 2 about the main axis of extension 36, light generated by the light system 4 can be seen from virtually all sides of the device 1, so the light system 4 will typically remain visible (directly or via a mirror used to visually monitor the operation being applied) regardless of the orientation in which the device 1 is held. In particular when the light system 4 is used for indicating a rapidly changing condition, such as shaving pressure, encountered resistance, exerted driving torque, speed of rotation or temperature of expelled air, it is particularly advantageous if an indication of a change of condition out of or into a preferred range is immediately noticed, so that the user can immediately act to cause the condition to return to a preferred range.

The light emitting surface may also be of a different shape than a closed loop and for instance be located on one side of the main axis of extension only or be in the form of a plurality of light emitting surfaces distributed around the main axis of extension. Also, the light may serve for other purposes than indicating an operative condition of the apparatus, such as for lighting a skin surface to be treated or merely for decorative purposes.

For a particularly good visibility of the light emitting surface 6 of the light system 4 during use, it is advantageous if the light emitting surface 6 extends circumferentially around a first housing portion to which the shaving unit 3 is connected. The first housing portion thus is an upper portion of the main housing 2 located between the shaving unit 3 and a second housing portion of the main housing 2 that is located remotely from the shaving unit 3. Preferably, the first housing portion has an axial length along the main axis of extension 36 smaller than or equal to 50% of the total axial length of the main housing 2 along the main axis of extension 36, and more preferably smaller than or equal to 33% and yet more preferably 20% of this total axial length. Thus, the light emitting surface 6 of the light system 4 is preferably arranged in an upper portion of the main housing 2 near the shaving unit 3, which is typically the portion of the device 1 a user watches most during use, and a large amount of room is left to hold the main housing 2 by hand without obscuring the light system 4 from view.

The drive train formed by the central drive shaft 10 and the driving coupling member 11 which is coupled to the shaving unit 3, when the device 1 is in operative condition, extends through the closed-loop light emitting surface 6. Thus, the light emitting surface 6 of the light system 4 remains visible if the shaving device 1 is rotated with the shaving unit 3 remaining projecting from the main housing 2 in generally the same direction, as typically occurs during shaving. Also during use of devices for carrying out other personal care operations, the operative unit generally remains directed in roughly the same direction as the device is manipulated during use, while movement and rotation in planes generally perpendicular to that direction are typically of a much larger magnitude. Regardless of such movements, the closed-loop light emitting surface of the light system 4 remains visible.

As is illustrated by FIG. 2, very little space is available in handheld personal care devices, which makes it difficult to realize the light emitting surface 6 such as to form a closed-loop surface circumferentially around the main housing 2 without adding a significant amount of volume to the main housing 2. Also the brightness of the light emitting surface 6 should preferably be substantially constant over the entire circumference, while in view of cost constraints the number of light sources should be limited. To meet these requirements, the light system 4 further includes an optically transparent light guide 23. The light emitting surface 6 is a closed-loop surface of the light guide 23 which faces in a direction having a main component in an outward radial direction relative to the main axis of extension 36. In this example, the light emitting surface 6 includes a central portion 37 oriented obliquely relative to the main axis of extension 36 about which the closed-loop light emitting surface 6 extends, an outer portion 38 facing mainly radially outward relative to the main axis of extension 36, and an inner portion 39 facing mainly axially relative to the main axis of extension 36. All these portions form closed-loop surfaces extending about the main axis of extension 36. The light guide 23 further has a light receiving surface comprising light receiving surface portions 27, 28 and 29 arranged in an average axial position relative to the main axis of extension 36 further away from the shaving unit 3 than an average axial position of the light emitting surface 6. The light receiving surface portions face in a direction having a main component in an axial direction relative to the main axis of extension 36 away from the shaving unit 3. The light sources 24-26 are, in the axial direction, each located in a position adjacent to a respective one of the light receiving surface portions 27-29 such that, during operation, light generated by the light sources 24-26 is received by the light receiving surface portions 27-29. The light guide 23 has a light guiding member in the form of a light guiding wall 31 extending from the light receiving surface portions 27-29 of the light receiving surface to the light emitting surface 6. The light guiding wall 31 is integrally formed with other parts of the light guide 23, but may also be a distinct member. A portion of the light guiding wall 31 including the closed-loop light emitting surface 6 of the light guide 23 extends as a closed-loop wall portion 40 about the main axis of extension 36. The light guiding wall 31 is curved and gradually spreads out from an orientation with a main component parallel to the main axis of extension 36 at the light receiving surface portions 27-29 of the light receiving surface to an orientation with a main component perpendicular to the main axis of extension 36 at the light emitting surface 6.

Thus, the light sources 24-26 are located spaced from the light emitting surface 6, which leaves room for components that provide the personal care function of the device (in this example in particular the shaving unit carrier 12 with suspension 14-17 and the coupling 11) in the spatial area around which the closed loop wall portion 40 of the light guiding wall 31 extends. Furthermore, the curved light guiding wall 31 guides light from a primarily axial direction of propagation, relative to the main axis of extension 36, at the light receiving surface portions 27-29 towards a more radially outward direction of propagation, relative to the main axis of extension 36, at the light emitting surface 6. The curved light guiding wall 31 also spreads the light in circumferential direction over a substantial distance, so that a very uniform illumination of the light emitting surface 6 is achieved. The uniformity of the illumination of the light emitting surface 6 is further enhanced because the plurality of light sources 24-26 are arranged, in the axial direction, in uniformly distributed positions adjacent to the light receiving surface portions 27-29 of the light receiving surface.

For the purpose of a uniform light distribution along the light emitting surface 6 while leaving room for components that provide the personal care functionality of the device 1, it is also advantageous that the light guiding wall 31 of the light guide 23 is a tub-shaped wall. According to said tub-shape of the light guiding wall 31, the light emitting surface 6 extends along a first circumferential edge portion 41 of the tub-shaped wall at a side of the tub-shaped wall facing the shaving unit 3, and the light receiving surface portions 27-29 of the light receiving surface extend along a second circumferential edge portion 42 of the tub-shaped wall at a side of the tub-shaped wall 31 remote from the shaving unit 3.

The uniformity of the illumination of the light emitting surface 6 is further enhanced by manufacturing said first circumferential edge portion 41 of the light guiding wall 31, including the light emitting surface 6, from an optically diffusive material. The optically diffusive material diffuses the light that enters the first circumferential edge portion 41, so that a more even distribution of the light along the circumference of the light emitting surface 6 is achieved. The remaining part of the light guiding wall 31 may be made from an optically transparent material having a relatively high optical transparency to optimize the light guiding properties of the light guiding wall 31. The light guiding wall 31 may be made from said two different materials by means of a 2K injection moulding process.

In some embodiments, a single light source can be sufficient to achieve the desired degree of uniformity of the intensity of the illumination in circumferential direction along the light emitting surface, provided that the single light source is far enough away from the light emitting surface to achieve the desired uniformity of the circumferential distribution of light in the light guide with a suitable design of the light guide. However, for an illumination intensity that is uniform in circumferential direction along the light emitting surface, it is advantageous to provide a plurality of light sources, in particular if little space is available for the light guiding wall 31 in the direction of the main axis of extension 36. The light sources 24-26 are then preferably arranged in the axial direction adjacent to the light receiving surface and distributed along the light receiving surface.

For accommodating components that provide the personal care functionality of the device (in this example shaving), and in particular for allowing parts of such components to extend from a position inside of the light guide 23 to a position outside of the light guide 23, the light guiding wall 31 of the light guide 23 has indentations 32, 33 and 35. Indentations 34 are provided for further improving uniformity of emitted light intensity in circumferential direction of the light emitting surface 6. The indentations 32, 33, 34, 35 each form an interruption of the light receiving surface at positions in-between the light sources 24-26, and thus divide the light receiving surface into the light receiving surface portions 27-29. The indentations 32-35 each extend from the light receiving surface in a direction towards the light emitting surface 6.

As is best seen with reference to the indentations 33 and 34, the indentations 32-35 each have two opposite side walls 43-49 that gradually converge from the light receiving surface in the direction towards the light emitting surface 6. This is advantageous for a uniform distribution of light in circumferential direction towards the light emitting surface 6, in particular if, as in the present example, the indentations 32-35 and the light sources 24-26 are located and shaped such that each portion of the light receiving surface 6 is (also) directly irradiated by light from at least one of the light sources 24-26 guided by the light guiding wall 31.

The light sources 24-26 are arranged in a watertight chamber 51 of the main housing 2, while the light guide 23 is arranged outside the watertight chamber 51 and separated from the light sources 24-26 and the watertight chamber 51 by a shield 13, which forms a sealing member of the watertight chamber 51. The shield 13 has an optically transparent wall portion 52 and a sealing portion 53 that is in sealing contact with adjacent parts of the main housing 2 which further bound the watertight chamber 51. Thus, while the light guide 23 is arranged outside the watertight chamber 51 and not protected against dust and water from the environment of the device 1, the light sources 24-26 are sealingly shielded from the environment and, thereby, protected against dust and water from the environment by means of the shield 13. The sealing portion 53 is a circumferential portion of the shield 13 surrounding the optically transparent wall portion 52, so that a seam between the circumference of the shield 13 and the adjacent parts of the main housing 2 is hermetically sealed.

The optically transparent wall portion 52 is made of a first material which is optically transparent, and the sealing portion 53 of the shield 13, which surrounds the optically transparent wall portion 52, is made of a second material. The second material is more flexible than the first material, but does not need to be optically transparent. Because the flexible second material is in sealing contact with the adjacent parts of the main housing 2 that bound the watertight chamber 51, the watertight chamber 51 is reliably sealed by a single part, which facilitates assembly and handling of parts during manufacturing of the device 1. The first material may for instance be polymethylmethacrylate (PMMA) or polycarbonate (PC), and the second material may for instance be a thermoplastic elastomer (TPE). For a reliable sealing function while providing a sufficient supporting function for the shield 13, the second material preferably has a hardness of 40-80 Shore A (ASTM D2240-15e1), and more preferably 50-70 Shore A (ASTM D2240-15e1) and/or a Young's modulus higher than 1.7 MPa, more preferably higher than 2.4 MPa, and lower than 5.5 MPa, more preferably lower than 2.8 MPa.

The optically transparent wall portion 52 and the sealing portion 53 of the shield 13 are integrally formed by means of an injection moulding process in which the first material is moulded to the second material or vice versa. Thus a particularly reliable connection between the first and the second material is obtained in a simple and efficient manner.

During use, light generated by the light sources 24-26 is transmitted to the light receiving surface portions 27-29 of the light guide 23 via the optically transparent wall portion 52. For this purpose, the optically transparent wall portion 52 is arranged adjacent to the light sources 24-26 and bounds the watertight chamber 51, the light guide 23 is arranged outside the watertight chamber 51, and the light receiving surface portions 27-29 are arranged adjacent to the optically transparent wall portion 52 in positions for receiving light from the light sources 24-26 via the optically transparent wall portion 52. Thus, the light sources 24-26 are very reliably shielded against dust and liquids from the environment of the device 1. Furthermore, since the light from the light sources 24-26 is transmitted to the light guide 23 via the optically transparent wall portion 52 of the shield 13, the light guide 23 does not need to extend into the watertight chamber 51 via an opening of the watertight chamber 51, in particular via an opening in the shield 13. Therefore, no additional sealing element is required along the light guide 23 at the position of such an opening for shielding the light sources 24-26. Moreover, because the light guide 23 can guide light along a distance from the optically transparent wall portion 52 to the position where the light is to be emitted or to be made visible to the user, in this example the closed-loop light emitting surface 6, a high degree of freedom of design with regard to the location of the light sources 24-26, the optically transparent wall portion 52 and the watertight chamber 51 is achieved. The location of the light sources 24-26 can be relatively far away from the location where the light is to be emitted or to be made visible, in this example the closed-loop light emitting surface 6, and the light may be visible from directions that are different from the direction in which the light is emitted by the light sources 24-26 and the direction wherein an outside surface of the optically transparent wall portion 52 is facing.

Since the chamber 51 is sealed watertight, the light sources 24-26 are very reliably shielded from water and other liquids as well as from shaving debris. The optically transparent wall portion 52 can be optically fully clear, but may also have one or more roughened (e.g. 'frosted') surface portions and/or contain white and/or coloured reflective particles for dispersing, scattering and/or colouring the transmitted light.

Although in other embodiments a small air gap might be present between the light receiving surface portions 27-29 and the optically transparent wall portion 52, in the embodiment shown in the figures the light guide 23 is arranged such that the light receiving surface portions 27-29 are in direct contact with the optically transparent wall portion 52 of the shield 13. This prevents shaving debris and other liquids and dust from entering between the light receiving surface portions 27-29 of the light guide 23 and the optically transparent wall portion 52 of the shield 13. Thus, the light path reliably remains open without requiring the light guide 23 to actually extend directly until in front of the light sources 24-26. Furthermore, the direct contact between the light receiving surface portions 27-29 and the optically transparent wall portion 52 of the shield 13 improves the optical coupling efficiency between the light sources 24-26 and the light guide 23.

Intrusion of debris and other dust in the light path can be prevented and a particularly high efficiency of light transmission can be achieved in an alternative embodiment of the device 1, wherein the light guide 23 is integrally formed with the optically transparent wall portion 52, for example by means of an injection moulding process. The light guide 23 may thus be integrally formed with the shield 13 including the optically transparent wall portion 52 and the shielding portion 53.

Although in the embodiments shown in the figures the light guiding member of the light system is a tub-shaped light-guiding wall 31, it will be clear for the person skilled in the art that the light guiding member may be configured in any suitable shape, with any suitable dimensions, and in any suitable number, in particular in dependence on the shape, dimensions and the number of light emitting surfaces via which the light needs to be made visible to the user. In a particular example, a plurality of light sources is provided in the watertight chamber, and the light of each light source is transmitted via a tube-shaped or pipe-shaped optically transparent light guiding member to a respective one of a plurality of light emitting surfaces arranged in different positions on the outer surface of the main housing. Such a plurality of tube-shaped or pipe-shaped light guiding members can in particular be integrally formed with the transparent wall portion and the shielding portion by means of an injection-moulding process. The integral formation of the transparent wall portion and the light guiding members is however also possible for light guiding members having a different shape than the tube-shaped or pipe-shaped light guiding members.

If the light guide is not in direct contact with the optically transparent wall portion, it is advantageous for the optical coupling efficiency if the distance between the light receiving surface of the light guide and the optically transparent wall portion is small, e.g. smaller than 1 mm, smaller than 0.3 mm and, most preferably, smaller than 0.05 mm.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfil the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A hand held personal care device comprising:
   a main housing arranged to be held by hand;
   an operative unit connected to the main housing and adapted for carrying out a personal care operation to a body part of a user;
   a light source; and
   an optically transparent light guide having a light receiving surface, a light emitting surface, and a light guiding member, the light guiding member extending from the light receiving surface to the light emitting surface for guiding light from the light receiving surface to the light emitting surface;
   wherein the light source is arranged in a watertight chamber of the main housing,
   wherein the main housing includes an optically transparent wall portion arranged adjacent to the light source and bounding said watertight chamber, and
   wherein the light guide is arranged outside said watertight chamber, said light receiving surface being arranged adjacent to said optically transparent wall portion in a position for receiving light from the light source via said optically transparent wall portion.

2. The device according to claim 1, wherein the light guide is arranged such that the light receiving surface is in direct contact with said optically transparent wall portion.

3. The device according to claim 1, wherein the light guide is integrally formed with the optically transparent wall portion.

4. The device according to claim 1, wherein the optically transparent wall portion is part of a sealing member which is in sealing contact with adjacent parts of the main housing which further bound the watertight chamber.

5. The device according to claim 4, wherein the optically transparent wall portion is made of a first optically transparent material, wherein the sealing member further comprises a sealing portion surrounding the optically transparent wall portion and made of a second material which is more flexible than the first material, and wherein said sealing portion is in sealing contact with said adjacent parts of the main housing.

6. The device according to claim 5, wherein the optically transparent wall portion and the sealing portion of the sealing member are integrally formed by means of an injection moulding process in which the first material is moulded to the second material or vice versa.

7. The device according to claim 1, wherein the light source, the optically transparent wall portion and the light guide constitute a light system for indicating an operational condition of the personal care device.

8. The device according to claim 1, wherein the main housing has a main axis of extension and wherein said light emitting surface extends circumferentially around the main housing as a closed-loop surface about the main axis of extension.

9. The device according to claim 8, wherein the main housing has a total axial length along the main axis of extension, and comprises a first housing portion to which the operative unit is connected and a second housing portion remotely arranged from the operative unit, wherein the light emitting surface extends circumferentially around the first housing portion, and wherein the first housing portion has an axial length along the main axis of extension ≤50% of the total axial length.

10. The device according to claim 8, wherein:
    the light emitting surface is a closed-loop surface of the light guide which faces in a direction having a main component in an outward radial direction relative to the main axis of extension;
    the light receiving surface is arranged in an average axial position relative to the main axis of extension further away from the operative unit than an average axial position of the light emitting surface, and facing in a direction having a main component in an axial direction relative to the main axis of extension away from the operative unit;
    the light source is arranged, in the axial direction, in a position adjacent to the light receiving surface;
    the light guiding member of the light guide is a light guiding wall, wherein at least a portion of the light guiding wall including the closed-loop surface of the light guide extends as a closed-loop wall portion about the main axis of extension; and
    seen in cross-section along a plane comprising the main axis of extension, said light guiding wall is curved and gradually spreads out from an orientation with a main component parallel to the main axis of extension at the light receiving surface to an orientation with a main component perpendicular to the main axis of extension at the light emitting surface.

11. The device according to claim 10, further comprising a plurality of light sources arranged, in the axial direction, in distributed positions adjacent to the light receiving surface of the light guide.

12. The device according to claim 10, wherein the light guiding wall has at least one indentation extending from the light receiving surface in a direction towards the light emitting surface, said indentation forming an interruption of the light receiving surface dividing the light receiving surface into at least two light receiving surface portions.

13. The device according to claim 12, wherein the indentation has two opposite side walls that gradually converge from the light receiving surface in the direction towards the light emitting surface.

14. The device according to claim 12, wherein each light source of the plurality of light sources is arranged, in the axial direction, in a position adjacent to a respective one of the at least two light receiving surface portions.

15. The device according to claim 1, wherein the device is an electric shaving device, and wherein the operative unit is a shaving unit.

* * * * *